United States Patent
Selén et al.

(10) Patent No.: US 9,025,523 B2
(45) Date of Patent: May 5, 2015

(54) PRIMARY CHANNEL ESTIMATION (75) Inventors: Yngve Selén, Uppsala (SE); Robert Baldemair, Solna (SE); Joachim Sachs, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 246 days.

(21) Appl. No.: 13/510,970

(22) PCT Filed: May 30, 2011

(86) PCT No.: PCT/EP2011/058835
§ 371 (c)(1),
(2), (4) Date: May 21, 2012

(87) PCT Pub. No.: WO2012/163401
PCT Pub. Date: Dec. 6, 2012

(65) Prior Publication Data
US 2012/0307731 A1    Dec. 6, 2012

(51) Int. Cl.
*H04W 92/10* (2009.01)
*H04W 16/14* (2009.01)
(Continued)

(52) U.S. Cl.
CPC ............ *H04L 5/0032* (2013.01); *H04W 52/243* (2013.01); *H04W 72/04* (2013.01); *H04W 16/14* (2013.01); *H04L 5/0048* (2013.01); *H04L 5/0062* (2013.01); *H04L 25/0224* (2013.01)

(58) Field of Classification Search
CPC .. H04L 5/0048; H04W 52/243; H04W 16/14; H04W 72/04
USPC ........... 370/315, 328–345; 455/501, 509–522
See application file for complete search history.

(56) References Cited

U.S. PATENT DOCUMENTS

2007/0104174 A1* 5/2007 Nystrom et al. ............... 370/343
2007/0195898 A1* 8/2007 Yamaguchi ................... 375/260
(Continued)

OTHER PUBLICATIONS

Budiarjo, I. et al. "On the Use of Virtual Pilots with Decision Directed Method in OFDM Based Cognitive Radio Channel Estimation Using 2x1-D Wiener Filter." IEEE International Conference on Communications, 2008, May 19-23, 2008, pp. 703-707, Beijing, China.
(Continued)

*Primary Examiner* — Un C Cho
*Assistant Examiner* — Fangyan Deng
(74) *Attorney, Agent, or Firm* — Murphy, Bilak & Homiller, PLLC (57) ABSTRACT

Some example embodiments may be directed towards a method in a network node, which may be comprised in a Radio Network, for transmitting a combined wireless communication signal. The combined wireless communication signal may comprise a primary and a secondary signal component. The method may comprise transmitting to an user equipment the secondary signal component according to a secondary transmission scheme such that the secondary signal component at least partially overlaps with the primary signal component with respect to a signal domain. The method may also comprise simultaneously, suppressing at least one portion of the secondary signal component during a transmission of the primary signal component.

Some example embodiments may be directed towards a method in an user equipment, which may be comprised in a Radio Network, for estimating the combined communication channel. The method may comprise receiving the combined wireless communication signal. The primary and secondary signal components may be received according to a primary and secondary transmission scheme, associated with a primary and secondary domain, respectively. The method may further comprise estimating the primary channel component when the secondary signal component is suppressed.

30 Claims, 8 Drawing Sheets

(51) Int. Cl.
*H04W 88/04* (2009.01)
*H04W 72/04* (2009.01)
*H04B 15/00* (2006.01)
*H04W 52/04* (2009.01)
*H04L 5/00* (2006.01)
*H04L 25/02* (2006.01)
*H04W 52/24* (2009.01)

(56) References Cited

U.S. PATENT DOCUMENTS

2009/0323666 A1* 12/2009 Malladi et al. ............... 370/345
2011/0122808 A1* 5/2011 Pandharipande et al. ..... 370/315
2013/0029706 A1* 1/2013 Sachs et al. .................. 455/501

OTHER PUBLICATIONS

Hosseini, H. et al. "CSI Feedback Model in the Context of Adaptive Cognitive Radio Systems." 2009 Third Asia International Conference on Modelling & Simulation, May 25-29, 2009, pp. 681-686, Bali, Indonesia.

Rashad, I. et al. "Efficient Pilot Pattern for OFDM-based Cognitive Radio Channel Estimation—Part 1." 14th IEEE Symposium on Communications and Vehicular Technology in the Benelux, Nov. 15, 2007, pp. 1-5, Delft, Netherlands.

Sachs, et al., "Cognitive Cellular Systems within the TV Spectrum", IEEE 2010, 1-12.

Selén, et al., "A short feasibility study of a cognitive TV black space system", IEEE 2011, 1-5.

* cited by examiner

PRIMARY CHANNEL ESTIMATION

TECHNICAL FIELD

Some example embodiments presented herein may be directed towards a method in a Base Station for transmitting to an user equipment a partially suppressed communication signal in an overlay system. Some example embodiments may comprise a method in an user equipment for estimating a primary channel component as a function of the suppression.

BACKGROUND

The use of mobile broadband (MBB) services is rapidly increasing in all regions of the world as a result of the ongoing transition from cellular telephony to MBB. Mobile data surpassed voice during December 2009 and yearly traffic increases in the order of 200% to 300% have been measured in real networks. This increase is predicted to continue.

Mobile operators now face the challenge of handling this immense traffic increase in their networks. One trend in radio research and regulation is based on the observation that many legacy systems are not using their spectrum very efficiently. While replanning of such legacy systems could free up spectrum for licensed mobile use, significant efforts in research, standardization, and regulation are being spent on finding ways of getting higher spectrum utilization in these bands by means of secondary usage of said spectrum.

A secondary user in this context is a user which is not using the spectrum for its licensed purpose and has obligations to not cause harmful interference to the licensed, or primary, usage. The broadcast TV systems have become the prime target for secondary spectrum usage and regulatory bodies already have rules in place for secondary usage. The main reasons for the interest in the TV spectrum are the stationary and predictability characteristics of the TV transmitters as well as the high value of the TV spectrum bands.

The presence of secondary users implies some sharing of spectrum bands between primary and secondary systems. The sharing of spectrum between two systems is usually grouped into one of the following three categories or approaches: (1) the overlay approach; (2) the underlay approach; or (3) the interweave approach.

The underlay approach uses a very low power per unit of bandwidth such that the interference caused to the primary system is kept below a defined level denoted the interference temperature. This level could be on the order of, or below, the thermal noise.

The interweave approach is the primary-secondary spectrum sharing approach. In this approach the signals of the secondary systems are orthogonalized to the primary signals in the time, frequency, and/or spatial domain(s). This can be achieved by, e.g., letting the secondary systems communicate on time/frequency resources that are unused by primary systems. Another type of interweave is spatial/frequency orthogonalization where channels unused by the primary system at certain locations can be used by secondary systems.

In the overlay approach the secondary system cooperates with the primary system and uses the same spectrum resources for its communication. This can be achieved by, e.g., letting the secondary system forward the primary signals while also transmitting secondary signals on the same communication resources. The approach involves interference management by the secondary system where one possible mechanism is interference cancellation at the secondary receivers in which the primary signal is decoded, reconstructed and subtracted from the received signal which then, ideally, only contains the secondary signal.

Studies show that the channel estimation performance may be an important parameter for the sharing of communication resources. For example, if the channel estimates are poor, the achievable secondary system SNRs will be very low. A straightforward implementation of a shared system transmitter just superimposes the secondary signals on the primary signals without making any modifications of the signal design. This results in the optimal channel estimation performance not being achieved, which limits the performance of the secondary system.

SUMMARY

Thus, at least one object of some of the example embodiments may be to provide an improved method of signal transmission. Some example embodiments may be directed towards a method in a Base Station for transmitting a combined wireless communication signal, where the combined wireless communication signal comprises a primary and a secondary signal component. The Base Station is in a Radio network. The method comprises transmitting to an user equipment the secondary signal component according to a secondary transmission scheme such that the secondary signal component at least partially overlaps with the primary signal component with respect to a signal domain. The method also comprises simultaneously, suppressing at least one portion of the secondary signal component during a transmission of the primary signal component.

Some example embodiments may be directed towards a method in an user equipment for estimating a combined communication channel, where the combined communication channel comprises a primary and a secondary channel component. The user equipment is in a Radio Network. The method comprises receiving a combined wireless communication signal comprising primary and secondary signal components. The primary and secondary signal components are received according to a primary and secondary transmission scheme, associated with a primary and secondary domain, respectively. The method further comprises estimating the primary channel component when the secondary signal component is suppressed.

Some example embodiments may be directed towards a Base Station for transmitting a combined wireless communication signal, where the combined wireless communication signal comprises a primary and a secondary signal component. The Base Station is comprised in a Radio Network. The Base Station comprises a communications port that is configured to transmit to an user equipment the secondary signal component according to a secondary transmission scheme such that the secondary signal component at least partially overlaps with the primary signal component with respect to a signal domain. The Base Station also comprises a suppression unit that is configured to suppress at least one portion of the secondary signal component during a transmission of the primary signal component.

Some example embodiments may be directed towards an user equipment for estimating a combined communication channel, where the combined communication channel comprises a primary and a secondary channel component. The user equipment is comprised in a Radio Network. The user equipment comprises a communication port that is configured to receive from a Base Station a combined wireless communication signal comprising primary and secondary signal components. The primary and secondary signal components are received according to a primary and secondary transmission scheme, associated with a primary and secondary signal domain, respectively. The user equipment also comprises an estimation unit that is configured to estimate the primary channel component during a period when the secondary channel component is suppressed.

Thus, example embodiments directed towards primary channel estimation may be useful as the suppression of the secondary signal may decrease interference which may normally appear in primary channel estimations.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Introduction

Figure 1:
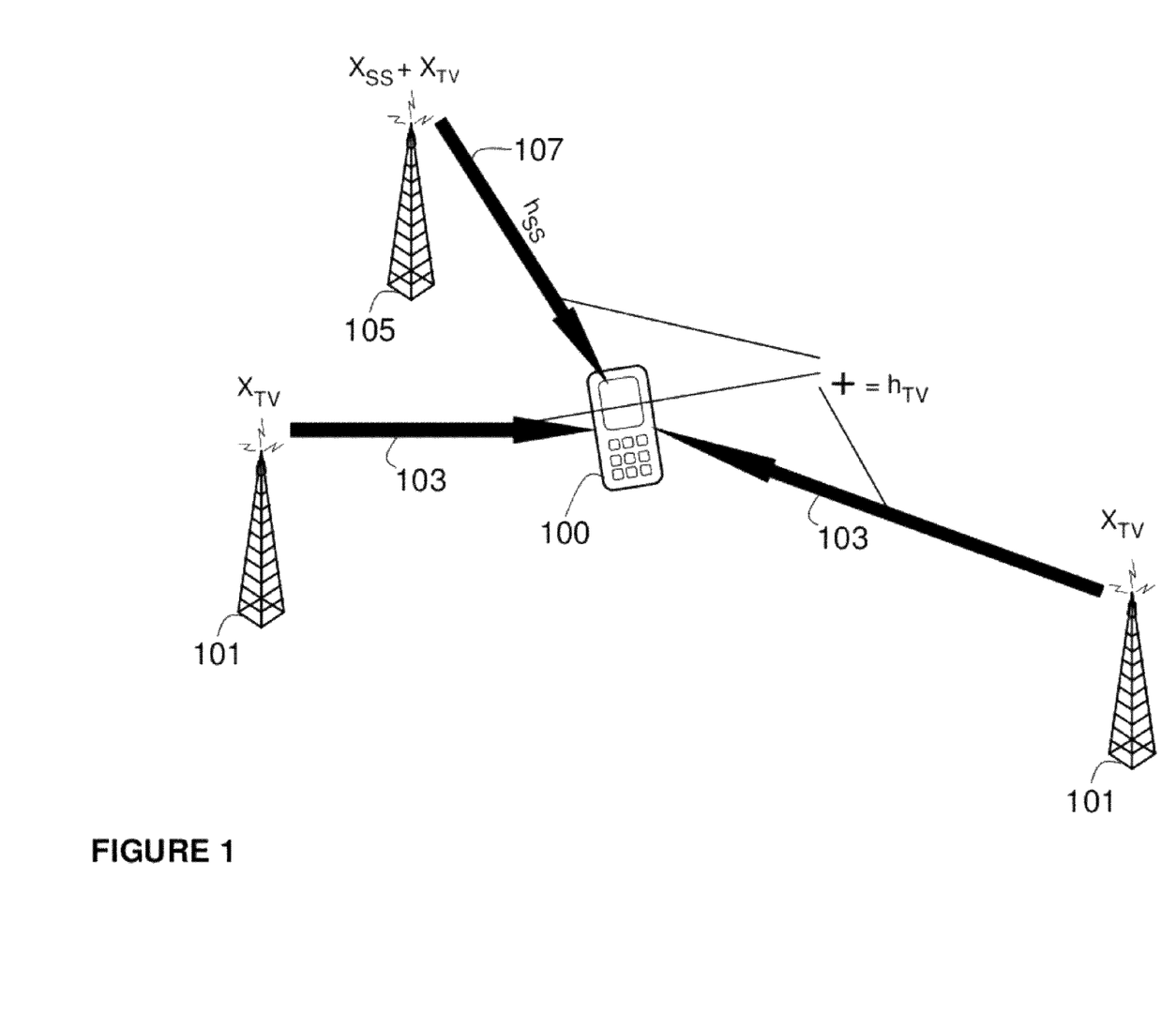
FIG. 1 is a schematic of an overlay communications system, according to some of the example embodiments.

FIG. 1 depicts an example of an overlay communication system. An overlay communication system is a system which utilizes spectrum sharing in the transmission of wireless communications. An overlay system typically involves a primary and secondary communication system. In the example provided by FIG. 1, the primary system may comprise a television broadcast system. The television broadcast system may comprise any number of transmitters 101 that may be configured to transmit wireless television signals, $X_{TV}$, (e.g., a primary signal component) on a primary channel, $h_{TV}$, 103. The primary channel may also be configured to transmit secondary signal components from a secondary system, as explained below.

In the example provided by FIG. 1, the secondary system may comprise a mobile communication system. The mobile broadband communications system may comprise any number of transmitters or Base Stations 105 that may be configured to simultaneously transmit a combined wireless signal on a secondary channel, $h_{SS}$, 107. The combined wireless signal may comprise the wireless television signal, $X_{TV}$, (e.g., the primary signal component) as well as a wireless communication signal, $X_{SS}$, (e.g., a secondary signal component).

Since the secondary channel, $h_{SS}$, conveys both primary and secondary signal components, the secondary channel may be considered a sub-set of the overall primary channel, $h_{TV}$, as shown in FIG. 1. Therefore, the secondary channel, $h_{SS}$, and the primary channel, $h_{TV}$, may comprise common sub-components.

It should be appreciated that the television broadcast and mobile broadband systems are used merely as examples. The example embodiments disclosed herein may be applied to any system utilized for transmitting any form of wireless data known in the art.

Figure 2:
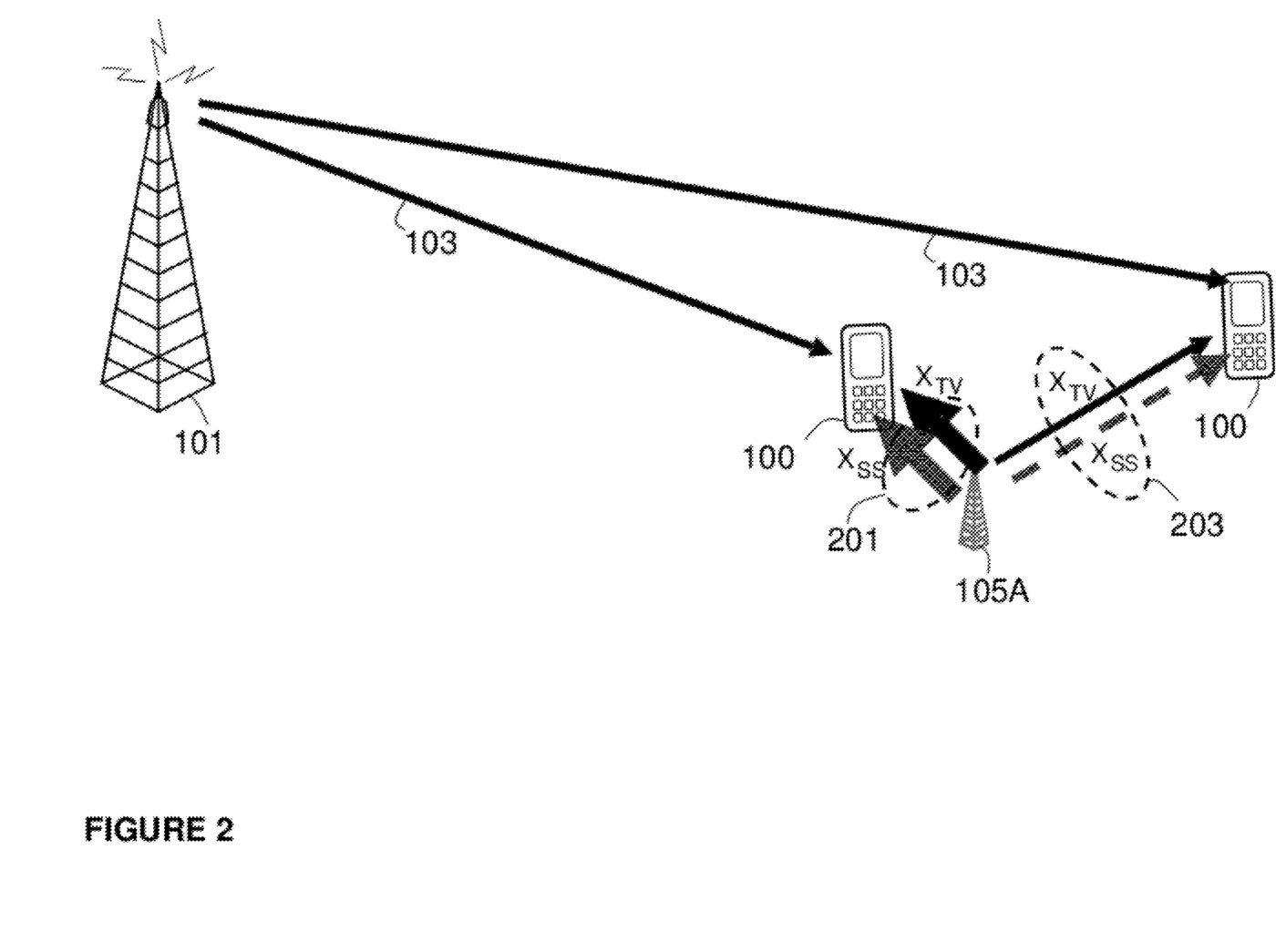
FIG. 2 is a schematic of an overlay communications system comprising a cognitive transmitter, according to some of the example embodiments.

FIG. 2 illustrates a cognitive overlay communications system. In the cognitive overlay communications system, cognitive secondary system transmitters 105A may be configured to transmit the primary signal and secondary wireless signal simultaneously 201, as described in relation to FIG. 1. The cognitive secondary system transmitters 105A may also be configured to transmit the primary signal and secondary wireless signal according to a transmission pattern 203. An example of a transmission pattern 203 may be an alternate transmission of the primary and secondary signals, such that the primary and secondary signals are not transmitted simultaneously. It should be appreciated that the alternate transmission pattern need not occur during the entire duration of the transmission, for example, transmission patterns may be applied during predetermined periods of transmission. It should be appreciated that any other type of transmission pattern may be employed. For example, the primary signal may be continuously transmitted while the secondary signal is transmitted at predetermined time intervals.

A mobile device, for example user equipment 100, may be configured to receive communications from transmitters belonging to both the primary and secondary systems. The received signal may be represented, for example, as follows:

$$Y = H_{TV}X_{TV} + H_{SS}X_{SS} + E_1 + H_{SS}E_2 + N \tag{1}$$

where Y is the combined received signal, $X_{TV}$ is the primary signal component (e.g., television broadcast signal), $X_{SS}$ is the secondary signal component (e.g., cellular communication signal), N is thermal noise and interference, $H_{TV}$ is the superposition of wireless channels that participate in the single-frequency broadcast of television signals, $H_{SS}$ describes the wireless channel experienced by the signal transmitted from the secondary system, $E_2$ is the Error Vector Magnitude (EVM) noise generated by transmitters used to generate $X_{SS}$ and $X_{TV}$, and $E_1$ is the EVM noise generated by all other transmitters in the overlay system and filtered by the channel.

After channel estimation, decoding, reconstruction, and cancellation of the primary television signal $X_{TV}$, the residual signal becomes:

$$Y_{SS} = (H_{TV} - H_{est})X_{TV} + H_{SS}X_{SS} + E_1 + H_{SS}E_2 + N \tag{2}$$

where $H_{est}$ denotes the estimated primary channel. It should be noted that the primary signal remains due to imperfect channel estimation. The channel estimation performance (e.g., how similar $H_{est}$ is to $H_{TV}$) plays a role when it comes to evaluation of the achievable Signal to Interference plus Noise Ratio (SINR) of $Y_{SS}$.

Thus, at least one object of some of the example embodiments herein may be to provide an improved method of signaling transmission. The technical effect of this object may be to provide improved channel estimations without greatly increasing the amount of hardware components or system resources.

Specifically, some example embodiments presented herein may be directed towards an improved channel estimation. Some example embodiments may be applied to a Base Station and/or user equipment node. Some example embodiments may be applied to methods of primary and/or secondary channel estimations. Some example embodiments may utilize pilot resource shifting in conjunction with the primary and/or secondary channel estimations.

The example embodiments will be further described below according to the respective sub-headings. First example configurations of a Base Station and user equipment will be provided. Thereafter, some example embodiments directed towards secondary channel estimation will be described. Thereafter, some example embodiment directed towards pilot resource shifting will be provided. Pilot resource shifting may be related to a method of signal transmission which may be utilized for channel estimations. Example embodiments directed towards cognitive transmission will also be provided. Thereafter, some example embodiments directed towards primary channel estimation will be provided.

It should be appreciated that a primary channel estimation procedure herein refers to the primary channel being estimated and the secondary channel may be estimated with use of the primary channel estimation (i.e., based on the primary pilot resources). A secondary channel estimation procedure may refer to the use of secondary pilot resources to estimate the secondary channel.

Base Station Configuration

Figure 3:
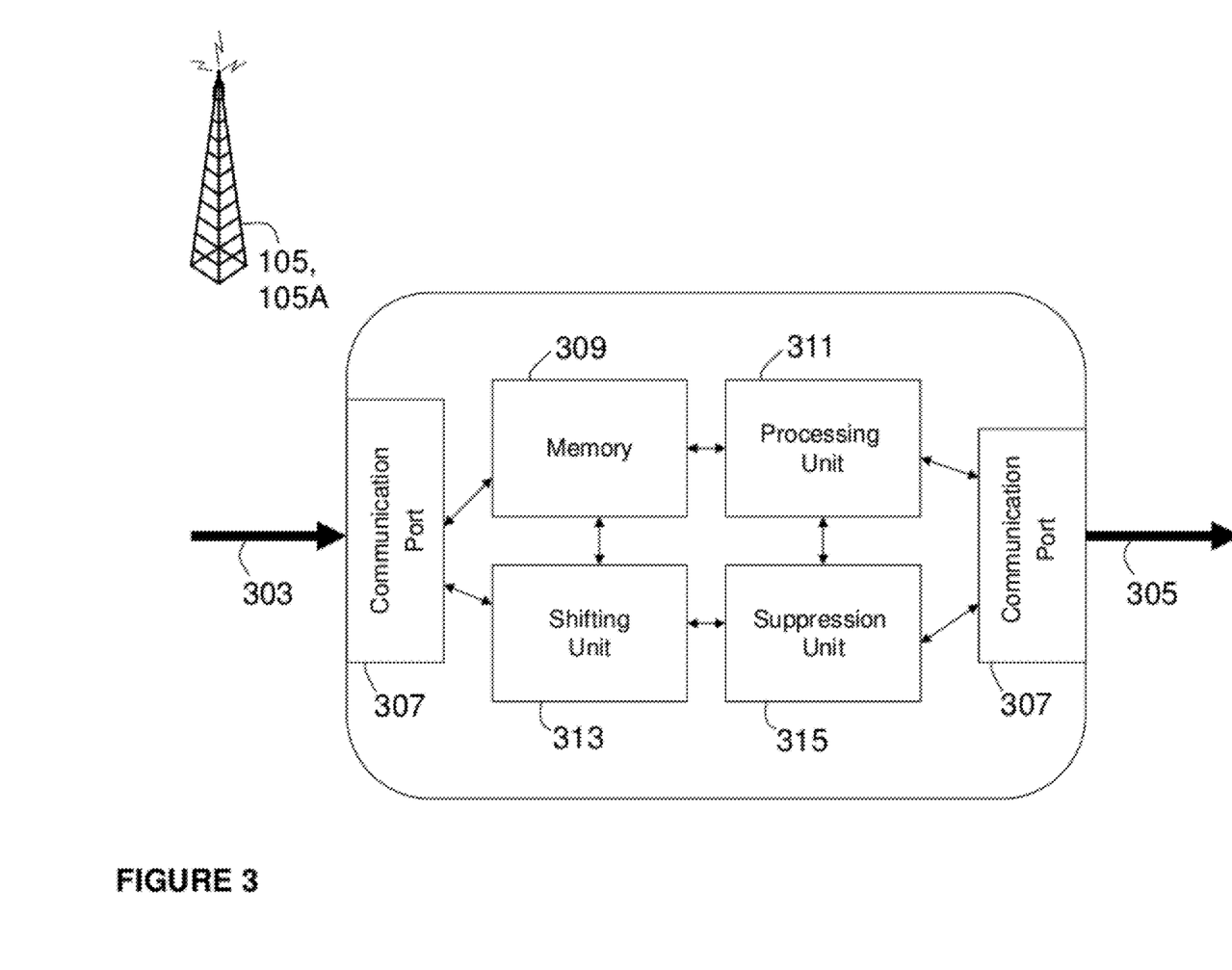
FIG. 3 is a schematic of a Base Station, according to some of the example embodiments.

FIG. 3 provides an illustrative example of a Base Station network node configuration, according to some of the example embodiments. The Base Station 101, 105, or 105A may comprise any number of communication ports 307. The communication ports 307 may be configured to receive and transmit any form of communications data 303 and 305, respectively. It should be appreciated that the Base Station 101, 105, or 105A may alternatively comprise a single transceiver port. It should further be appreciated that the communication or transceiver port may be in the form of any input/output communications port known in the art.

The Base Station 101, 105, or 105A may further comprise at least one memory unit 309 that may be in communication with the communication ports 307. The memory unit 309 may be configured to store received, transmitted, and/or measured data of any kind and/or executable program instructions. The memory unit 309 be any suitable type of computer readable memory and may be of a volatile and/or non-volatile type.

The Base Station 101, 105, or 105A may also comprise a shifting unit 313 that may be configured to shift or alter the transmission of the primary and/or secondary signals. The Base Station 101, 105, or 105A may further comprise a suppression unit 315 that may be configured to suppress, puncture, and/or mute the transmission of the primary and/or secondary signal components. The Base Station 101, 105, or 105A may also comprise a general processing unit 311.

It should be appreciated that the shifting unit 313, the suppression unit 315, and/or the processing unit 311 may be any suitable type of computation unit, e.g. a microprocessor, digital signal processor (DSP), field programmable gate array (FPGA), or application specific integrated circuit (ASIC). It should also be appreciated that the shifting unit 313, the suppression unit 315, and/or the processing unit 311 need not be comprised as separate units. The shifting unit 313, the suppression unit 315, and/or the processing unit 311 may be comprised as a single computational unit or any number of units.

User Equipment Configuration

Figure 4:
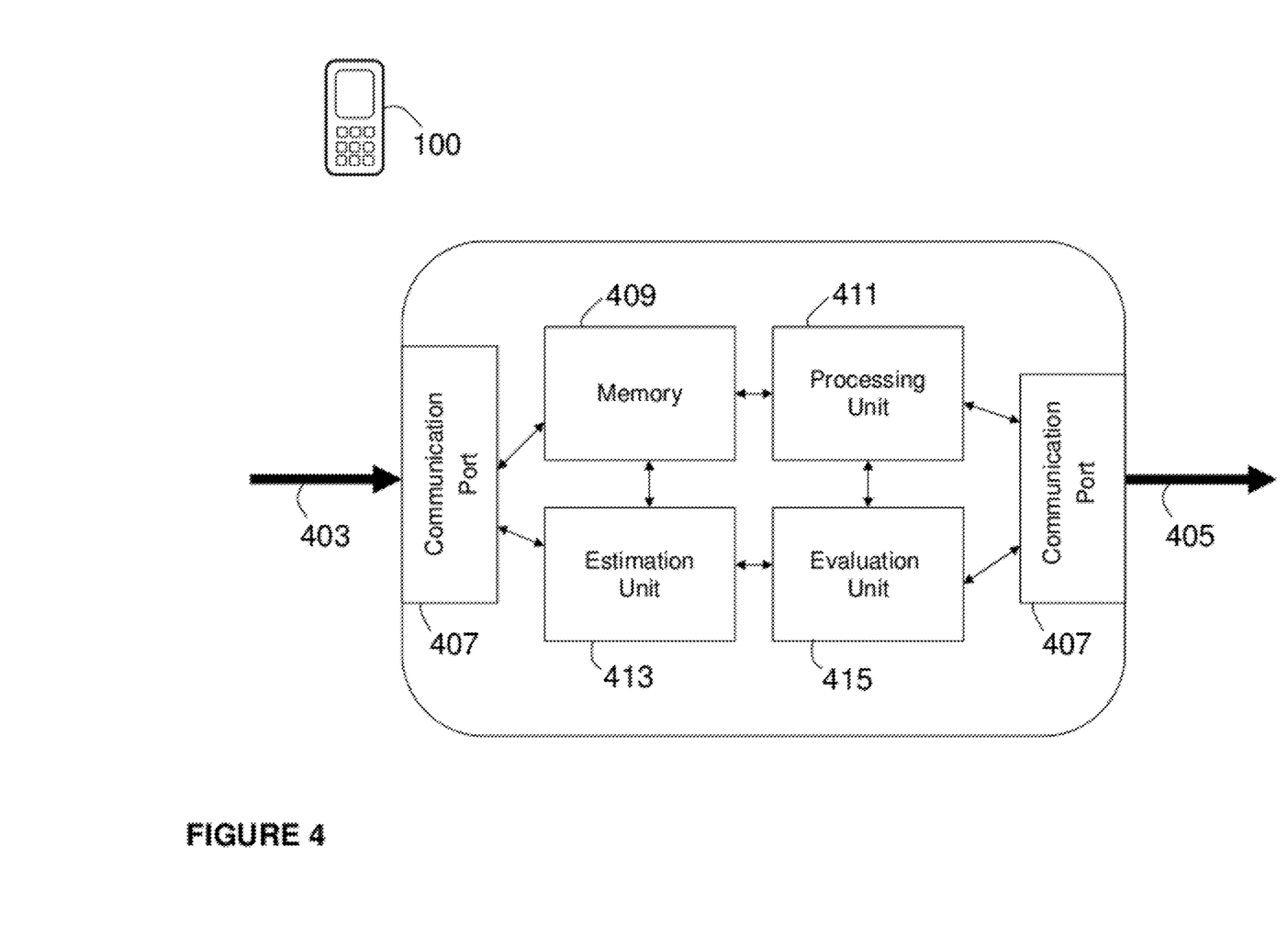
FIG. 4 is a schematic of an user equipment, according to some of the example embodiments.

FIG. 4 provides an illustrative example of a user equipment network node configuration, according to some of the example embodiments. The user equipment 100 may comprise any number of communication ports 407. The communication ports 407 may be configured to receive and transmit any form of communications data 403 and 405, respectively. It should be appreciated that the user equipment 100 may alternatively comprise a single transceiver port. It should further be appreciated that the communication or transceiver port may be in the form of any input/output communications port known in the art.

The user equipment 100 may further comprise at least one memory unit 409 that may be in communication with the communication ports 407. The memory unit 409 may be configured to store received, transmitted, and/or measured data of any kind and/or executable program instructions. The memory unit 409 be any suitable type of computer readable memory and may be of a volatile and/or non-volatile type.

The user equipment 100 may also comprise an estimation unit 413 that may be configured to estimate the primary and/or secondary signals and/or the primary and/or secondary communication channels. The user equipment 100 may further comprise an evaluation unit 415 that may be configured to determine common sub-components between the primary and secondary communication channels. The user equipment 100 may also comprise a general processing unit 411.

It should be appreciated that the estimation unit 413, the evaluation unit 415, and/or the processing unit 411 may be any suitable type of computation unit, e.g. a microprocessor, digital signal processor (DSP), field programmable gate array (FPGA), or application specific integrated circuit (ASIC). It should also be appreciated that the estimation unit 413, the evaluation unit 415, and/or the processing unit 411 need not be comprised as separate units. The estimation unit 413, the evaluation unit 415, and/or the processing unit 411 may be comprised as a single computational unit or any number of units. It should also be appreciated that the user equipment 100 may be a mobile phone, a Personal Digital Assistant (PDA), or any other wireless communications network unit capable to communicate with a base station over a radio channel.

Pilot Resource Shifting

Some example embodiments may be directed towards pilot resource shifting. Pilot resource shifting may be applicable if the secondary system allows for pilot shifting in the time and/or frequency domain. An example of such a system is a Long Term Evolution (LTE) system where the pilot resources may be shifted in time and/or frequency. Presumably overlap between the pilot resources of the primary and secondary systems may be different based upon the pilot resource shifting in the secondary system. Thus, some example embodiments may be directed towards the optimal shifting of pilot resources of the secondary system. It should be appreciated that some example embodiments may also comprise pilot resource shifting of the primary system.

Figure 5:
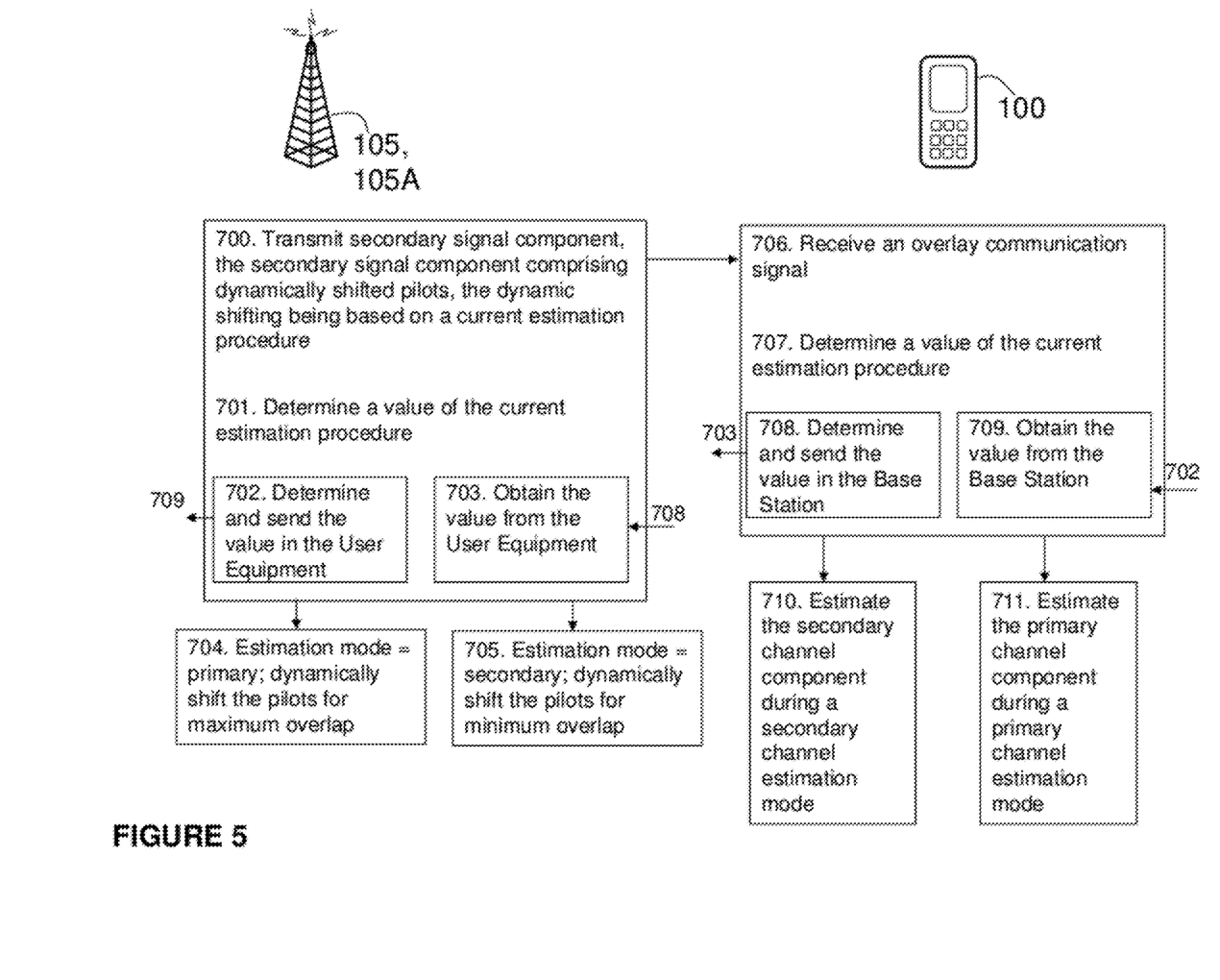
FIG. 5 is a flow diagram depicting example operations for pilot resource shifting which may be performed by the Base Station and/or the user equipment of FIG. 3 and FIG. 4, respectively, according to some of the example embodiments.

If the secondary system uses the channel estimate of the primary system as described above the pilot shifting may be selected to maximize the overlap between the pilots, assuming that the non-overlapping pilots of the secondary system are enough to give a rough estimate of the sub-components in the channel representation if needed (e.g., as explained in operation 506). The overlapping pilots may then be suppressed since they will not be used (or will at least not be used for decoding). The suppression may comprise puncturing or muting, which will be described in greater detail below. This allows a larger portion of the secondary resources to be used for data.

The optimization of the pilot shifting is not a time critical parameter to compute since it may be part of configuration (e.g., can be computed off-line). FIG. 5 illustrates a flow diagram depicting example operations which are utilized in a network node (e.g., Base Station 105 or 105A) and the user equipment 100 of FIGS. 3 and 4, respectively, in providing the shifting of pilot resources and estimation based on the shifting.

Operation 700:

The shifting of pilot resources comprises transmitting 700 from the network node (e.g., Base Station 105 or 105A) the secondary signal component to be received by an user equipment 100. The secondary signal component comprises secondary pilot resources that are dynamically shifted. The dynamic shifting is based on a current estimation procedure.

The communications port 307 is configured to transmit the secondary signal component to an user equipment 100. A shifting unit 313 is configured to dynamically shift secondary pilot resources of the secondary signal component based on a current estimation procedure.

Operation 701:

In this operation the network node (e.g., Base Station 105 or 105A) may determine 701 a value of the current estimation procedure. The determining 701 may be performed by the shifting unit 313 and/or the processing unit 311.

Operation 702:

The operation of determining 701 may further comprise the operation of the network node determining 702 the value of the current estimation procedure and thereafter sending said value to the user equipment 100. The value of the current estimation may be useful such that the user equipment 100 may have knowledge of when optimal channel estimation may be performed. Since the determining 702 occurs within the network node (e.g., Base Station 105 or 105A), it is the network node which may dictate the value of the estimation procedure and the shifting of pilot resources. The operation of determining 702 may be performed by the shifting unit 313 and/or the processing unit 311.

Operation 703:

The operation of determining 701 may comprise the operation of the network node obtaining 703 the value of the current estimation procedure from the user equipment 100. In such an instance, it is the user equipment 100 which may dictate the current estimation mode and the shifting of pilot resources. The operation of obtaining 703 may be performed by the communications ports 307.

Operation 704:

Pilot resource shifting may also comprise the operation of dynamically shifting 704 the secondary pilot resources to provide a maximum overlap with primary pilot resources of the primary signal component, when the current estimation procedure is a primary estimation procedure. It should be appreciated that the maximizing may comprise any overlap percentage above a certain user programmable threshold. The operation of shifting 704 may be performed by the shifting unit 313 or the processing unit 311.

Operation 705:

Pilot resource shifting may also comprise the operation of dynamically shifting 705 the secondary pilot resources to provide a minimum overlap with primary pilot resources of the primary signal component, e.g., when the current estimation procedure is a secondary channel estimation procedure. It should be appreciated that the minimizing may comprise any overlap percentage below a certain user programmable threshold. The operation of shifting 705 may be performed by the shifting unit 313 or the processing unit 311.

Operation 706:

Pilot resource shifting may also comprise a number of operations performed within the user equipment 100, for example operations 706-711. Example operations may comprise the operation of the user equipment 100 receiving 706 from a network node (e.g., Base Station 105 or 105A) a combined wireless communication signal comprising primary and secondary signal components. Secondary pilot resources of the secondary signal component being shifted based on a current estimation procedure.

A communications port 407 is configured to receive from a network node (e.g., Base Station 105 or 105A) a combined wireless communications signal comprising primary and secondary signal components, secondary pilot resources of the secondary signal component are shifted based on a current estimation procedure.

Operation 707:

Operations may also comprise determining 707 the value of the current estimation procedure within the user equipment 100. The operation of determining 707 may be performed by the estimation unit 413 or the processing unit 411.

Operation 708:

The operation of determining 707 may comprise the user equipment 100 determining 708 the value of the current estimation procedure and sending said value to the network node. The network node may receive the sent value as described in relation to operation 703. The operation of determining 708 may be performed by the estimation unit 413 or the processing unit 411.

Operation 709:

The operation of determining 707 may comprise the user equipment 100 obtaining 709 the value of the current estimation procedure from the network node. The value obtained from the network node may be provided as explained in relation to operation 702. The operation of obtaining may be performed by the communications port 407.

Operation 710:

Operations further comprise the user equipment 100 estimating 710 the secondary channel when the current estimation procedure is a secondary channel estimation procedure.

The estimation unit 413 and/or the processing unit 411 are further configured to estimate the secondary channel when the current estimation procedure is a secondary channel estimation procedure.

Operation 711:

Operations further comprise the user equipment 100 estimating 711 the primary channel when the current estimation procedure is a primary channel estimation procedure.

The estimation unit 413 and/or the processing unit 411 are further configured to estimate the primary channel when the current estimation procedure is a primary channel estimation procedure.

Thus, as described above, the shifting of pilot resources may be useful in providing optimized channel estimations. Specifically, during primary channel estimation a maximum overlap of pilot resources may enable a greater number of secondary resources to be used for data. During secondary channel estimation a minimum overlap of pilot resources may reduce interference caused by the primary system on the secondary pilot resources.

Cognitive Transmission and Estimation

Figure 6:
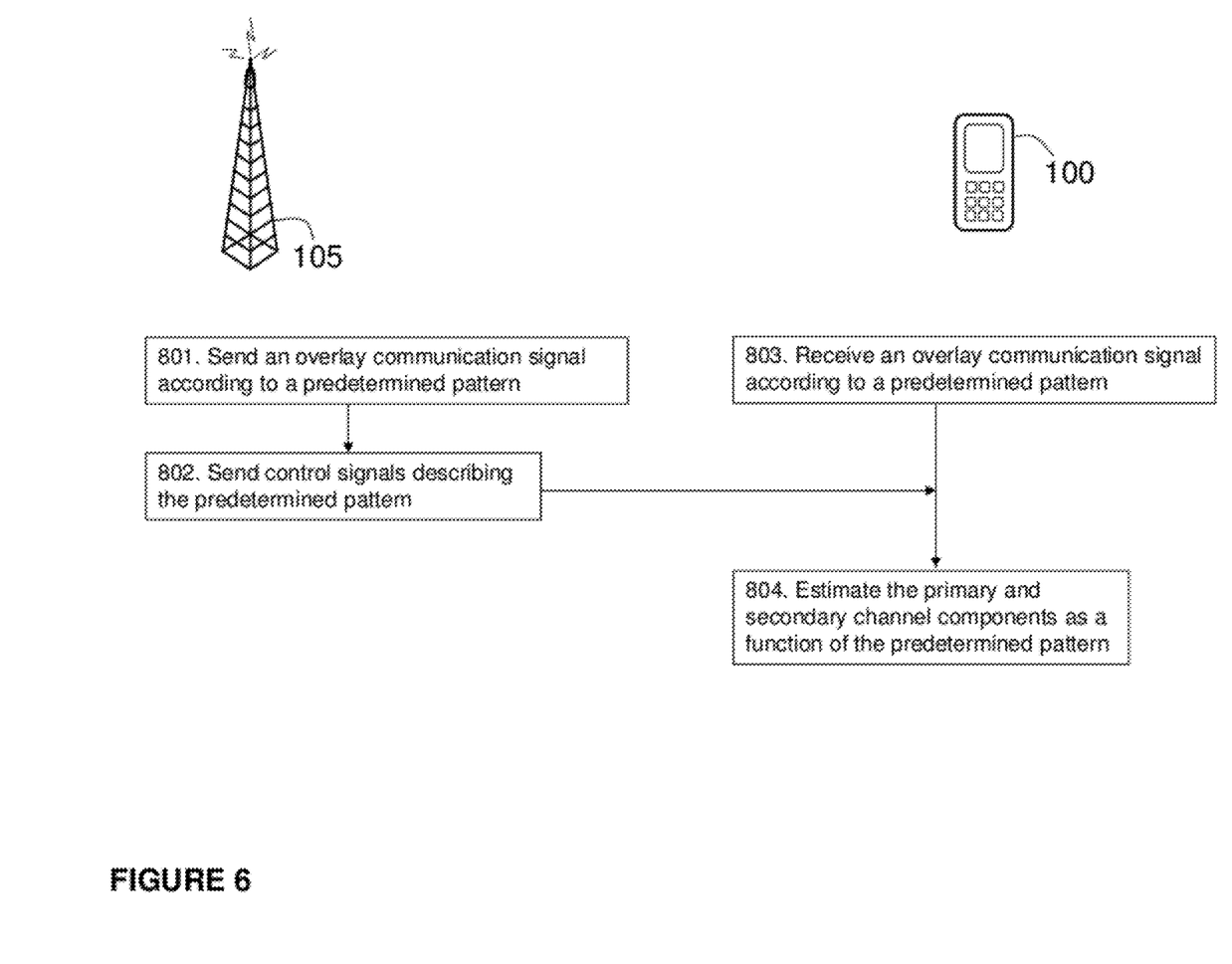
FIG. 6 is a flow diagram depicting example operations for cognitive signal transmission and channel estimation which may be performed by the Base Station and/or the user equipment of FIG. 3 and FIG. 4, respectively, according to some of the example embodiments.

In some example embodiments, cognitive transmission and estimation may be employed. FIG. 6 is a flow diagram depicting example operations performed by a network node (e.g., Base Station 105A) and the user equipment 100 for handling primary and secondary channels, wherein the secondary channel is a sub-component of the primary channel, according to some of the example embodiments.

Operation 801:

Cognitive transmission and estimation may comprise a network node (e.g., Base Station 105A) sending 801 combined wireless communication signals on the secondary channel, which is a subpart of the primary channel, according to a predetermined pattern.

The communication ports 307 is configured to send combined wireless communication signals the secondary channel, which is a subpart of the primary channel, according to a predetermined pattern. Specifically, some example embodiments may comprise an alternating between sending 801 combined wireless communication signals and being quiet (e.g., not sending any signals at all) or an alternating between sending 801 combined wireless communication signals and only transmitting the primary signal according to the predetermined pattern.

Operation 802:

Operations may also comprise a network node (e.g., Base Station 105A) sending 802 control signals to a cognitive user equipment 100, or a user equipment capable of receiving cognitive data, the control signals may comprise information indicative of the predetermined pattern. The communications port 307 may be further configured to send the control signals to a cognitive user equipment 100, where the control signals may comprise the predetermined pattern. The sending 802 of control signals may be useful to the user equipment 100, as the user equipment may adjust its current estimation procedure based on what is currently being sent.

Operation 803:

Cognitive transmission and estimation may also comprise an user equipment 100 receiving 803 combined wireless communication signals on the primary and secondary channels according to a predetermined pattern.

The communications port 407 is configured to receive combined wireless communications signals on the primary and secondary channels according to a predetermined pattern. Specifically, some example embodiments may comprise alternately receiving 803 combined wireless communication signals on the primary and secondary channels and the primary signal only on the primary channel (e.g., from 101 and 105, 105A is quiet).

Operation 804:

Operations may further comprise the operation of the user equipment 100 estimating 804 the primary and secondary channels as a function of the predetermined pattern. As described in relation to operation 802, the user equipment may gain knowledge of the current signal being transmitted via the control signals. It should be appreciated that in some example embodiments, the user equipment 100 may be configured to send a request to the network node that either the primary or secondary signal be sent at any given time.

Thus, as described above, cognitive transmission and estimation may provide improved channel estimations such that when the primary or secondary channel is being estimated, the secondary or primary signal, respectively, may not be transmitted from the cognitive transmitter, according to some example embodiments. Thus, channel estimation interference may be reduced.

Primary Channel Estimation

As described above, in relation to equation (2), the channel estimation performance (e.g., how similar $H_{est}$ is to H) may play a role when it comes to evaluation of the achievable Signal to Interference plus Noise Ratio (SINR) of $Y_{SS}$. However, the overlaid secondary system may add interference to the pilots of the primary system and therefore effect the channel estimation. Thus, some example embodiments may be directed towards increasing the primary system channel estimation performance by suppressing the resources of the secondary system which overlaps with the pilot resources of the primary system. In some example embodiments, suppression may comprise puncturing or muting of the pilot resources.

In an Orthogonal Frequency Division Multiplexing (OFDM) scenario, this means that no or little power may be allocated to the time and/or frequency resources of the secondary system which overlap with the time and/or frequency resources used for channel estimation (e.g., pilots, or reference symbols) in the primary system. According to some example embodiments, a margin could be introduced such that slightly larger resources are left empty in the secondary system. This may reduce leakage effects from the non-empty resources of the secondary system to the pilot resources of the primary system. Leaving larger resource regions empty may be useful if OFDM system parameters do not coincide since then orthogonality between the two systems is not given. Potentially complete OFDM symbol(s) needs to be punctured or muted.

In the suppression of pilot resources, puncturing may be utilized. Puncturing may comprise the process or replacing resource elements with a zero element after rate matching resulting in empty regions. It should also be appreciated that such empty regions may already be considered during rate matching, i.e. no information is mapped onto those resources. This process is referred to as muting. It should further be appreciated that a cancelling signal may be applied to the regions of interest, such that the applied canceling signal results in a reduced power region.

Figure 7:
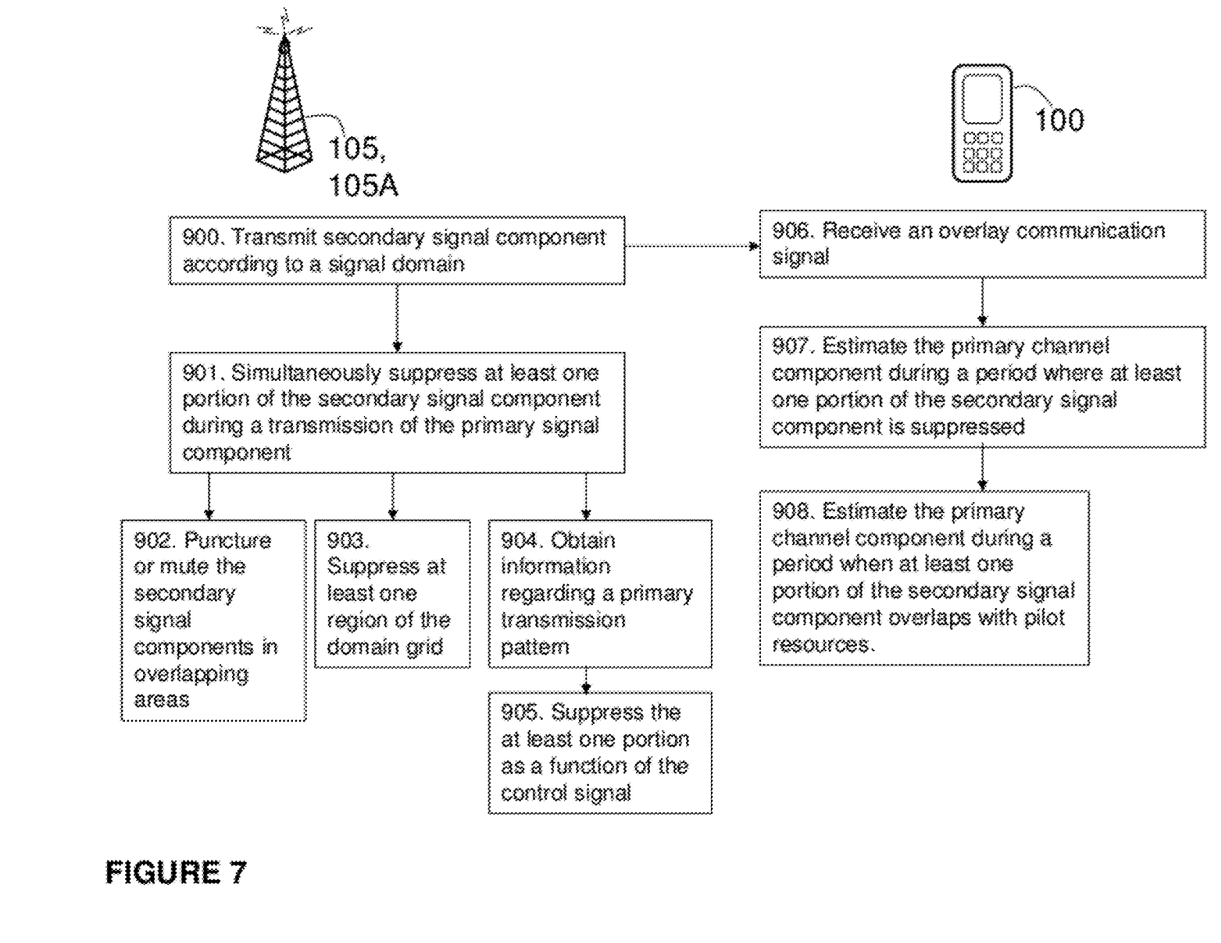
FIG. 7 is a flow diagram depicting example operations for primary channel estimation which may be performed by the Base Station and/or user equipment of FIG. 3 and FIG. 4, respectively, according to some of the example embodiments.

FIG. 7 is a flow diagram illustrating example operations which may be performed by a network node (e.g., Base Station 105 or 105A) and an user equipment 100 with regard to primary channel estimation, according to some of the example embodiments.

Operation 900:

Primary channel estimation may comprise a network node (e.g., Base Station 105 or 105A) transmitting 900 to an user equipment 100 the secondary signal component according to a secondary transmission scheme such that the secondary signal component at least partially overlaps with the primary signal component with respect to a signal domain.

The communications port 307 may be configured to transmit to the user equipment 100 the secondary signal component according to a secondary transmission scheme such that the secondary signal component at least partially overlaps with the primary signal component with respect to a signal domain.

It should be appreciated that the signal domain may be a time, frequency, and/or code domain. It should also be appreciated that the primary and secondary signal components may be transmitted with respect to a domain grid transmission scheme.

Figures 8A, 8B:
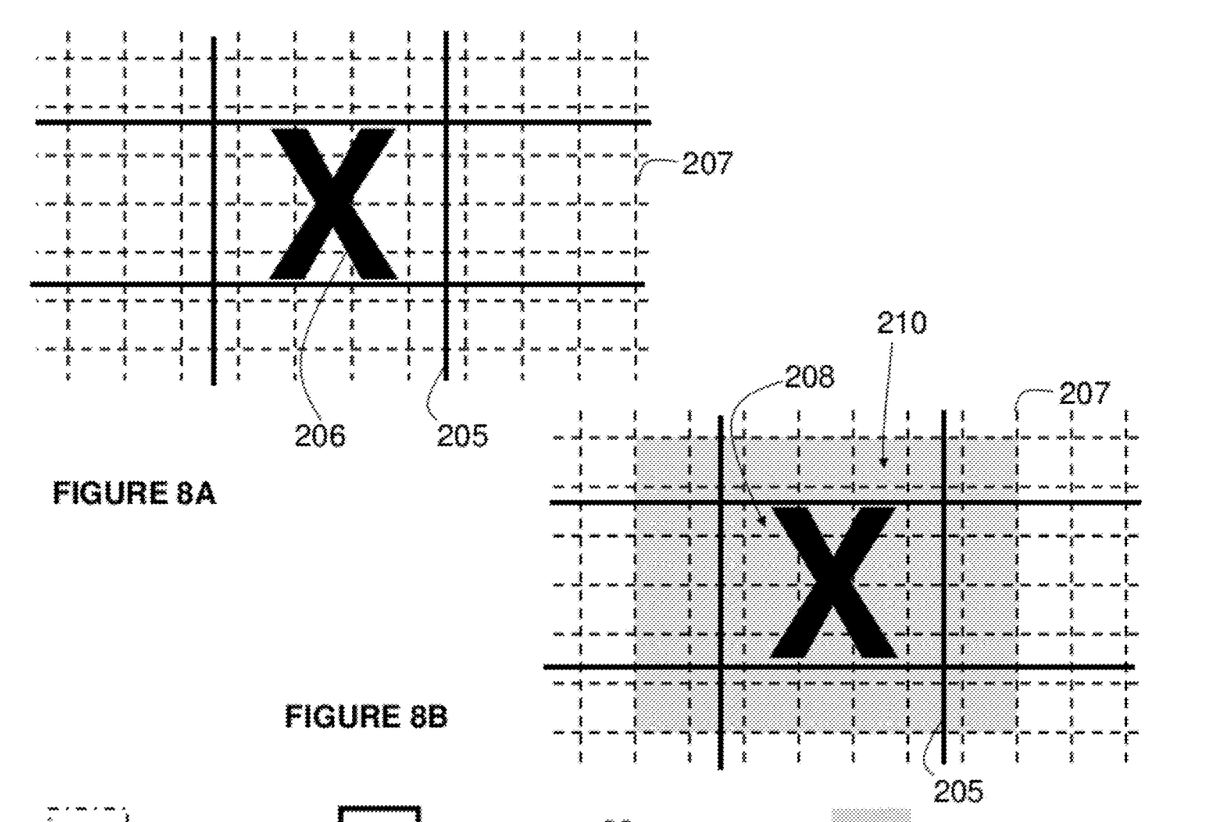
FIGS. 8A and 8B are illustrative examples of signal suppression, according to some of the example embodiments.

FIG. 8A illustrates an example of an overlapping signal transmission comprising primary and secondary signal transmission using a time and frequency domain grid transmission. The primary signal may be transmitted according to a time-frequency primary grid 205. The secondary signal may be transmitted according to a time-frequency secondary grid 207. As illustrated from FIG. 8A, the secondary domain grid may comprise a secondary grid spacing which may be different from a primary grid spacing of a primary domain grid transmission scheme. An example of a primary pilot resource 206 is also provided in FIG. 8A.

Operation 901:

Primary channel estimation also comprises the network node (e.g., Base Station 105 or 105A) simultaneously suppressing 901 at least one portion of the secondary signal component during the transmission of the primary pilot signal. The suppression unit 315 and/or processing unit 311 are configured to suppress at least one portion of the secondary signal during a transmission of the primary pilot.

FIG. 8B provides an example of signal suppression. In the center of the primary grid 205 an 'X' 206 represents a pilot resource symbol. As shown in FIG. 8B, portions of the secondary grid which overlap with the pilot resources of the primary grid 205 may be suppressed (denoted in FIG. 8B as shaded areas). Thus, as the primary channel is being estimated (e.g., with the utilization of the primary pilot resources 206), any interference from the secondary system may be greatly reduced due to the suppression. It should be appreciated that while FIGS. 8A and 8B illustrate the use of a time-frequency grid, any type of grid in the time, frequency, or code domain may be employed.

Operation 902:

As described above, the suppression may comprise the network node puncturing or muting 902 the at least one portion of the secondary signal component which overlaps with pilot resources of the primary signal component. The operation of puncturing or muting 902 may be performed by the suppression unit 315 and/or the processing unit 311. It should be appreciated that the puncturing or muting may be performed together with a cancelling signal such that once the cancelling signal is combined with the secondary signal; the combined signal may experience a reduced (e.g., zero or close to zero) amplitude in the predetermined grid cells.

Operation 903:

Operations may further comprise the network node suppressing 903 at least one region of the secondary domain grid. The operation of suppression 903 may be performed by the suppression unit 315 and/or the processing unit 311.

As shown in FIG. 10B, in some example embodiments for any portion of the secondary grid 207 which overlaps with the primary pilot resource 'X' 206, an entire region of the grid cell may be suppressed. For example, only a portion of the secondary grid cell 208 overlaps with the pilot symbol 206. However, in some example embodiments the entire region of the secondary grid cell 208 may be suppressed in order to improve the primary channel estimation performance. Similarly, in some example embodiments, an entire region of a secondary grid cell 210 may be suppressed even if the cell does not overlap with the primary pilot resource 206. Specifically, secondary grid cells surrounding or in close proximity to the primary pilot resource may be suppressed as well.

Operation 904:

Operations may further comprise the network node (e.g., Base Station) being a secondary transmitter and the secondary transmitter obtaining 904 information regarding a transmission pattern of a pilot resource of the primary signal component. A secondary transmitter may be a secondary system transmitter which solely transmits the secondary communication signal. The operation of obtaining 904 may be performed by the communications port 307 and/or the processing unit 311.

Operation 905:

The operation of obtaining 904 may further comprise the secondary transmitter suppressing 905 the at least one portion of the secondary signal component as a function of the information. The operation of suppressing 905 may be performed by the suppression unit 315 and/or the processing unit 311 of the secondary transmitter.

Operation 906:

Operations may further comprise an user equipment 100 receiving 906 a combined wireless communication signal. The primary and secondary signal components being received according to a primary and secondary transmission scheme associated with a primary and secondary signal domain, respectively.

The communications port 407 is configured to receive from a network node (e.g., Base Station 105 or 105A) a combined wireless communication signal comprising primary and secondary signal components, the primary and secondary signal components being received according to a primary and secondary transmission scheme, associated with a primary and secondary signal domain.

Operation 907:

Operations also comprise an user equipment 100 estimating 907 the primary channel when the secondary signal component is suppressed. The estimation unit 413 and/or processing unit 411 are configured to estimate the primary channel during a period when the secondary channel is suppressed.

Operation 908:

The operation of estimating 907 may comprise the User Equipment 100 estimating 908 the primary channel during a period when the at least one portion of the secondary signal component overlaps with a pilot resource of the primary signal component. For example, even if only a small portion of a grid cell overlaps with the pilot resource, an entire region of the grid cell of the secondary signal may be suppressed, as explained in relation to operation 903. The operation of estimating may be performed by the estimation unit 413 and/or the processing unit 411.

Thus, as described above, primary channel estimation may be improved with the use of suppression, according to some example embodiments. The use of suppression may reduce interference during estimation.

CONCLUSION

Some example embodiments may comprise a portable or non-portable telephone, media player, Personal Communications System (PCS) terminal, Personal Data Assistant (PDA), laptop computer, palmtop receiver, camera, television, radar and/or any appliance that comprises a transducer designed to transmit and/or receive radio, television, microwave, telephone and/or radar signals. The device according to the example embodiments is however intended for use particularly, but not exclusively for high frequency radio equipment.

The foregoing description of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method in a network node for transmitting a combined wireless communication signal, the combined wireless communication signal comprising a primary and a secondary signal component, the network node being in a radio network, the method comprising:
transmitting to an user equipment the secondary signal component according to a secondary transmission scheme such that the secondary signal component at least partially overlaps with the primary signal component with respect to a signal domain; and,
simultaneously, suppressing a portion of the secondary signal component that overlaps with one or more pilot resources of the primary signal component, in the signal domain, while continuing to transmit one or more additional portions of the secondary signal component that overlap with the primary signal component, in the signal domain, during a transmission of the primary signal component.

2. The method of claim 1, wherein the network node is a base station.

3. The method of claim 1, wherein the transmitting further comprises at least partially overlapping the secondary signal component with the primary signal component with respect to at least one of a time domain, a frequency domain, and a code domain.

4. The method of claim 1, wherein the suppressing comprises puncturing or muting the portion of the secondary signal component that overlaps with the one or more pilot resources of the primary signal component.

5. The method of claim 1, wherein the transmitting comprises transmitting the secondary signal component with respect to a secondary domain grid transmission scheme having a secondary domain grid comprising a secondary grid spacing which is different from a primary grid spacing of a primary domain grid transmission scheme.

6. The method of claim 5, wherein the suppressing comprises suppressing a region of the secondary domain grid.

7. The method of claim 6, wherein the suppressing further comprises transmitting non-zero valued cancellation data to minimize the secondary signal component in the region.

8. The method of claim 1, wherein the network node is a cognitive transmitter.

9. The method of claim 1, wherein the network node is a secondary transmitter, the method further comprising:
obtaining information regarding a transmission pattern of pilot resources of the primary signal component; and
suppressing the portion of the secondary signal component that overlaps with the one or more pilot resources of the primary signal component as a function of the information.

10. The method of claim 1, wherein the primary signal component is a broadcast communication signal.

11. The method of claim 1, wherein the secondary signal component is a broadband communication signal.

12. A method in an user equipment for estimating a combined communication channel, the combined communication channel comprising a primary and a secondary channel component, the user equipment being in a radio network, the method comprising:
receiving from a network node a combined wireless communication signal comprising primary and secondary signal components, the primary and secondary signal components being received according to a primary and secondary transmission scheme, associated with a primary and secondary domain, respectively, such that the secondary signal component at least partially overlaps with the primary signal component with respect to a signal domain; and
estimating the primary channel component when a portion of the secondary signal component that overlaps with one or more pilot resources of the primary signal component in the signal domain is suppressed, while one or more additional portions of the secondary signal component that overlap with the primary signal component continue to be received.

13. The method of claim 12, wherein the network node is a base station.

14. The method of claim 12, wherein the secondary and primary domains are each at least one of a frequency domain, a time domain, and a code domain.

15. The method of claim 12, wherein the receiving further comprises receiving the primary and secondary signal components with respect to a primary and secondary domain grid, respectively, wherein a grid spacing of the primary domain grid is different than a grid spacing of the secondary domain grid.

16. The method of claim 12, wherein the estimating further comprises estimating the primary channel component during a period when at least one portion of the secondary signal component overlaps with a pilot resource of the primary signal component.

17. The method of claim 12, wherein the primary signal component is a broadcast communication signal.

18. The method of claim 12, wherein the secondary signal component is a broadband communication signal.

19. A network node for transmitting a combined wireless communication signal, the combined wireless communication signal comprising a primary and a secondary signal component, the network node being comprised in a radio network, the network node comprising:
a communications port configured to transmit to a user equipment the secondary signal component according to a secondary transmission scheme such that the secondary signal component at least partially overlaps with the primary signal component with respect to a signal domain; and
a suppression circuit configured to suppress a portion of the secondary signal component that overlaps with one or more pilot resources of the primary signal component, in the signal domain, while continuing to transmit one or more additional portions of the secondary signal component that overlap with the primary signal component, in the signal domain, during a transmission of the primary signal component.

20. The network node of claim 19, wherein the network node is a base station.

21. The network node of claim 19, wherein the signal domain is at least one of a time domain, a frequency domain, and a code domain.

22. The network node of claim 19, wherein the communications port is configured to transmit the secondary signal component so that it at least partially overlaps with the primary signal component with respect to at least one of a time domain, a frequency domain, and a code domain.

23. The network node of claim 19, wherein the network node is a cognitive transmitter.

24. The network node of claim 19, wherein the primary signal component is a broadcast communication signal.

25. The network node of claim 19, wherein the secondary signal component is a broadband communication signal.

26. An user equipment for estimating a combined communication channel, the combined communication channel comprising a primary and a secondary channel component, the user equipment being comprised in a radio network, the user equipment comprising:
a communication port configured to receive from a network node a combined wireless communication signal comprising primary and secondary signal components, the primary and secondary signal components being received according to a primary and secondary transmission scheme, associated with a primary and secondary signal domain, respectively, such that the secondary signal component at least partially overlaps with the primary signal component with respect to a signal domain; and
an estimation circuit configured to estimate the primary channel component during a period when a portion of the secondary channel component that overlaps with one or more pilot resources of the primary signal component in the signal domain is suppressed, while one or more additional portions of the secondary signal component that overlap with the primary signal component continue to be received.

27. The user equipment of claim 26, wherein the secondary and the primary signal domain are each at least one of a time domain, a frequency domain, and a code domain.

28. The user equipment of claim 26, wherein the communication port is configured to receive the primary and secondary signal components with respect to a primary and secondary domain grid, respectively, wherein a grid spacing of the primary domain grid is different than a grid spacing of the secondary domain grid, and wherein the estimating unit is configured to estimate the primary channel component during a period when at least one portion of the secondary signal component overlaps with a pilot resource of the primary signal component.

29. The user equipment of claim 26, wherein the primary signal component is a broadcast communication signal.

30. The user equipment of claim 26, wherein the secondary signal component is a broadband communication signal.

* * * * *